United States Patent [19]

Kindig et al.

[11] Patent Number: 5,015,034
[45] Date of Patent: May 14, 1991

[54] UPHOLSTERY SYSTEM

[75] Inventors: Alan L. Kindig; Kenneth M. Lindberg; Bradford J. Burrows, all of Holland, Mich.

[73] Assignee: Prince Corporation, Holland, Mich.

[21] Appl. No.: 595,798

[22] Filed: Oct. 9, 1990

Related U.S. Application Data

[63] Continuation of Ser. No. 408,084, Sep. 15, 1989, abandoned, which is a continuation-in-part of Ser. No. 276,917, Nov. 25, 1988, Pat. No. 4,890,883.

[51] Int. Cl.⁵ .............................................. A47C 7/54
[52] U.S. Cl. .................... 297/227; 160/380; 296/39.1; 297/218; 297/226; 297/441
[58] Field of Search ............... 297/218, 219, 226, 227, 297/441; 5/470, 471; 24/355, 457, 462, 706.4; 160/380; 296/39.1

[56] References Cited

U.S. PATENT DOCUMENTS

| | | |
|---|---|---|
| 735,540 | 8/1903 | Lyon . |
| 1,120,686 | 12/1914 | Burrower ........................ 160/398 X |
| 1,562,105 | 11/1925 | McDonald . |
| 2,349,226 | 5/1944 | Thomas ........................... 160/391 X |
| 2,897,889 | 8/1959 | Kessler . |
| 3,137,372 | 6/1964 | Nash ................................ 160/398 X |
| 3,302,260 | 2/1967 | Cuddeback . |
| 3,354,473 | 11/1967 | Schwarz et al. ................. 160/395 X |
| 3,803,671 | 4/1974 | Stuppy et al. . |
| 3,822,734 | 7/1974 | Tombu . |
| 3,960,197 | 6/1976 | Daniels . |
| 3,981,534 | 9/1976 | Wilton . |
| 4,083,157 | 4/1978 | Anthonioz . |
| 4,189,880 | 2/1980 | Ballin . |
| 4,233,790 | 11/1980 | Meadows . |
| 4,244,621 | 1/1981 | Lazaroff et al. . |
| 4,252,365 | 2/1981 | Ferguson . |
| 4,410,027 | 10/1983 | Lucous . |
| 4,473,927 | 10/1984 | Miller . |
| 4,549,334 | 10/1985 | Miller . |
| 4,570,990 | 2/1986 | Flowerday . |
| 4,662,038 | 5/1987 | Walker . |
| 4,715,651 | 12/1987 | Wakamatsu . |
| 4,759,087 | 7/1988 | Zeilinger . |
| 4,763,946 | 8/1988 | Robbins et al. . |
| 4,788,806 | 12/1988 | Sease . |
| 4,813,740 | 3/1989 | Yon et al. . |

FOREIGN PATENT DOCUMENTS

| | | | |
|---|---|---|---|
| 210710 | 2/1987 | European Pat. Off. ............ | 297/441 |
| 77125 | 12/1961 | France ............................... | 297/218 |

Primary Examiner—Peter R. Brown
Attorney, Agent, or Firm—Price, Heneveld, Cooper, DeWitt & Litton

[57] ABSTRACT

An upholstery system for a vehicle accessory includes a substrate with a U-shaped channel adjacent an edge and including a lip extending from one wall. A trim member includes spaced locking tabs which underlie the lip for compressibly holding an edge of upholstery material in the channel. In one embodiment, pins in the trim ring extend through the material and into apertures in an outer flange of the channel. In another embodiment, the locking tabs are formed on the substrate and the trim member includes interengaging locking slots.

5 Claims, 3 Drawing Sheets

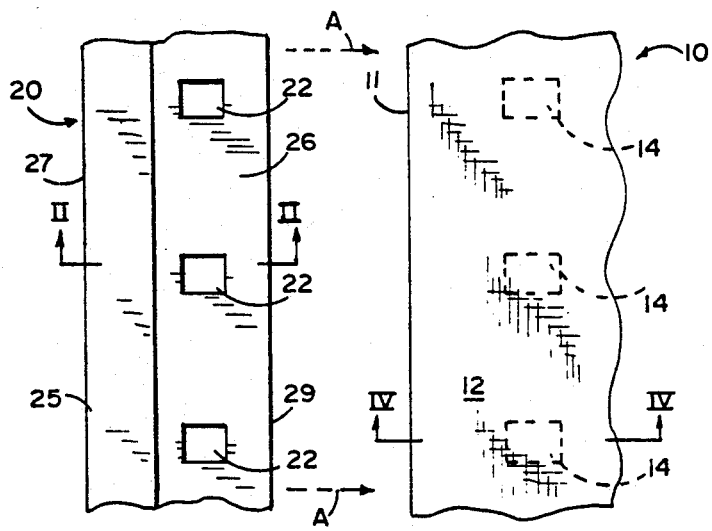
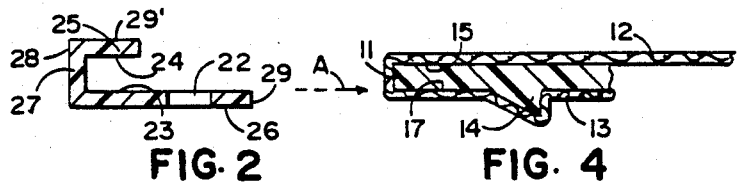
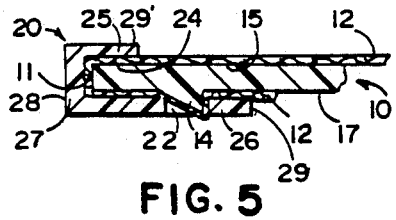
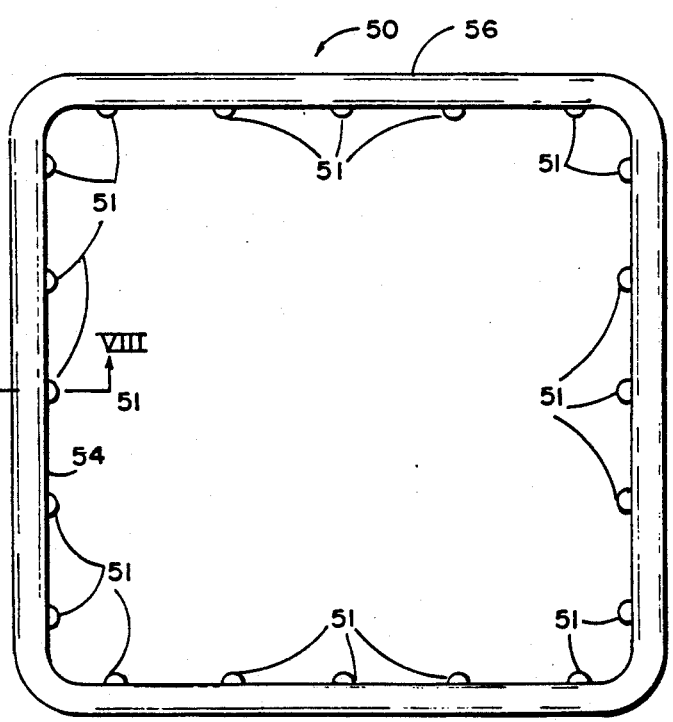

UPHOLSTERY SYSTEM

The present application is a continuation of co-pending application Ser. No. 07/408,084 filed Sep. 15, 1989, now abandoned, which is a continuation-in-part of application Ser. No. 276,917 filed Nov. 25, 1988, now U.S. Pat. No. 4,890,883, issued Jan. 2, 1990 entitled UPHOLSTERY SYSTEM. The subject matter of the prior application and patent are incorporated herein by reference.

BACKGROUND OF THE INVENTION

The present invention pertains to an upholstery system and particularly to an upholstery system for use in connection with a vehicle accessory such as an armrest.

There exists a variety of manners in which upholstery can be trimmed out in a vehicle to provide a clean appearing end product. In the past it has been common to stitch, glue and/or staple edges of upholstery tucked around a corner of a panel so as not to expose the edge of the material. In some applications, however, such as covered armrests, when the cover is opened, the free ends of the fabric are exposed and are unsightly when simply glued or otherwise fastened to the cover.

In order to provide a finished appearance to an article such as an armrest and in particular a covered armrest therefore, it is desired to provide an upholstery system in which both a neat trim appearance is provided and one which is not expensive either in cost of labor in upholstering the product or parts employed.

SUMMARY OF THE PRESENT INVENTION

The system of the present invention accommodates these goals and provides a readily assembled system in which, according to one embodiment, a substrate to be upholstered includes a groove with a peripheral inner lip and pin receiving apertures. A trim member, with a decorative surface, is shaped in the configuration of the U-shaped channel and is inserted therein. In one embodiment, the trim member includes upholstery piercing pins and interlocking tabs such that upholstery material can be pressed into the U-shaped channel and held in place by the locking pins while the tabs interlock the trim member to the lip of the U-shaped channel.

In another embodiment, a substrate to be upholstered includes a plurality of spaced locking tabs spaced inwardly from an edge of the substrate. A U-shaped trim member, with a decorative outer surface, includes a plurality of slots which lockably engage said locking tabs when the trim member is fitted over the edge of the substrate to hold the upholstery material between the substrate and the trim member.

The resultant structure provides a mechanical means by which upholstery can be trimmed to a substrate, such as parts of a vehicle armrest, and mechanically held in position in a secure fashion which is readily accomplished during assembly of the armrest.

These and other features, objects and advantages of the present invention will become apparent upon reading the following description thereof together with reference to the accompanying drawings in which:

BRIEF DESCRIPTION OF THE DRAWINGS

FIG. 1 is a fragmentary plan view of a trim member of one embodiment of the present invention;

FIG. 2 is a cross-sectional view of the structure shown in FIG. 1 taken along section lines II—II of FIG. 1;

FIG. 3 is a fragmentary plan view of a substrate to be upholstered employing the trim member shown in FIGS. 1 and 2;

FIG. 4 is a fragmentary cross-sectional view of the structure shown in FIG. 3 taken along section lines IV—IV of FIG. 3;

FIG. 5 is a fragmentary cross-sectional view of the structure of FIGS. 2 & 4 shown assembled;

FIG. 7 is a top plan view of the trim member shown in FIG. 6;

FIG. 8 is a fragmentary cross-sectional view taken along section lines VIII—VIII of FIG. 7;

DETAILED DESCRIPTION OF THE PREFERRED EMBODIMENT

Figure 12:
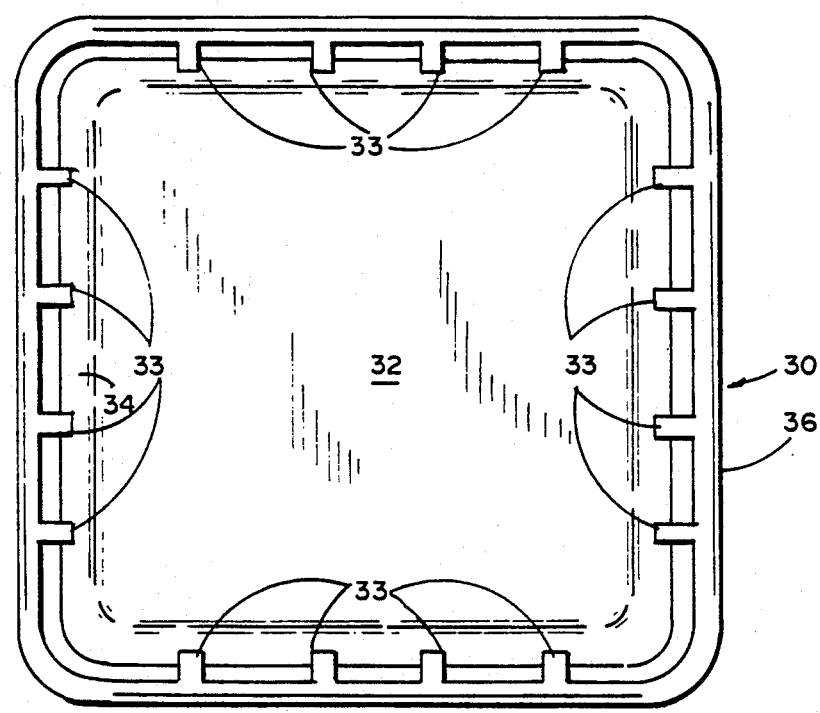
FIG. 12 is a bottom plan view of the structure shown in FIG. 10.
Figure 6:
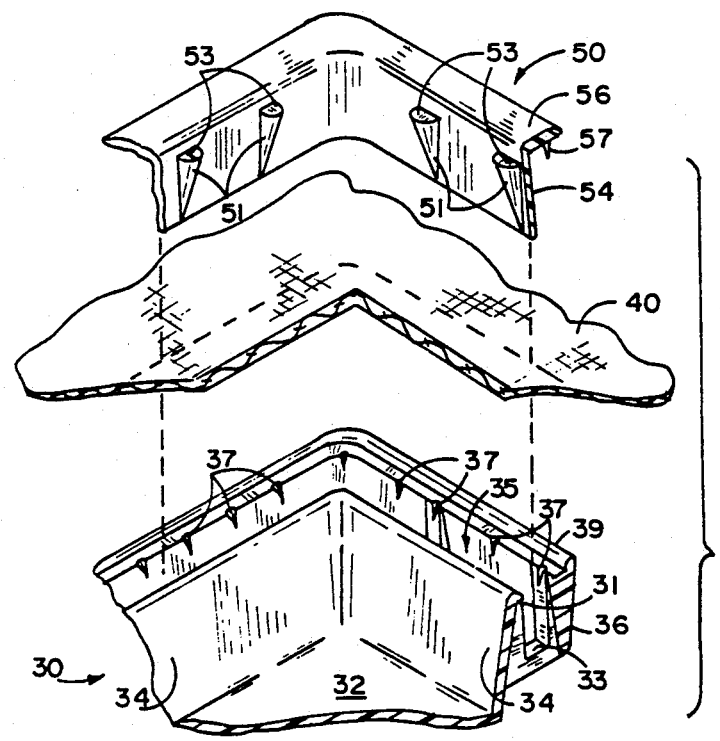
FIG. 6 is a perspective exploded view of an alternative embodiment of the present invention.

Referring initially to FIGS. 1-5 there is shown a first embodiment of the present invention which includes a substrate 10 such as a shift boot, armrest, or other accessory to be covered by upholstery 12. Substrate 10 has an edge 11 to be trimmed by upholstery 12 which can be any type of upholstery material such as woven fabric, vinyl, leather or the like, typically used in connection with the upholstery of vehicle trim pieces such as armrests or the like. In order to provide a trim appearance to edge 11 as well as to retain the end 13 of fabric 12 thereto, a trim member 20 is employed which lockably interengages a plurality of spaced locking tabs 14 formed on one side of substrate 10. Tabs 14 are triangular in cross-sectional as seen in FIG. 4 and are spaced inwardly from edge 11 as seen in FIG. 3.

Member 20 comprises a generally L-shaped member as best seen in FIG. 2 with an extended lower leg 26 having a plurality of spaced rectangular apertures 22 spaced inwardly from the edge 29 of member 20 to align with tabs 14 when installed as seen in FIG. 5. Member 20 also includes an upwardly extending leg 27 and a inwardly projecting lip 25 having an inner surface 24 which compressibly engages the top surface 15 of member 10 while the inner lower surface 23 engages the lower surface 17 to compressibly clamp the fabric 12 with notches so formed in member 20. The locking tabs 14 fit within apertures 22 as best seen in FIG. 5 to lockably hold the fabric in place.

Outer decorative surfaces 28 and 29' of member 20 are opposite upholstery material 12 and may be pebble-grained or otherwise textured to provide a desired ornamental appearance to the edge of member 10. Trim member 20 may take any form including a linear section, a closed ring of circular or rectangular configuration or any other configuration designed to mate with the edge 11 of substrate 10 to be trimmed. In the preferred embodiment of the invention members 10 and 20 were molded of a polymeric material such as ABS, polyvinyl chloride (PVC); or other material commonly used for armrests, consoles, or other vehicle accessories. Member 20 also can be molded in a colored material to blend with the upholstery material.

Another embodiment of the present invention is shown in FIGS. 6-13 in which a substrate 30 to be trimmed by an upholstery material 40 employs a snap-in trim member 50. The substrate 30 in the embodiment shown is a generic generally concave object which is illustrative of the trimming technique and can be any vehicle accessory such as a console, arm rest edge or the like. The edge construction and operation of the trim member can be applied to any particular edge to be finished.

Figures 10, 11:
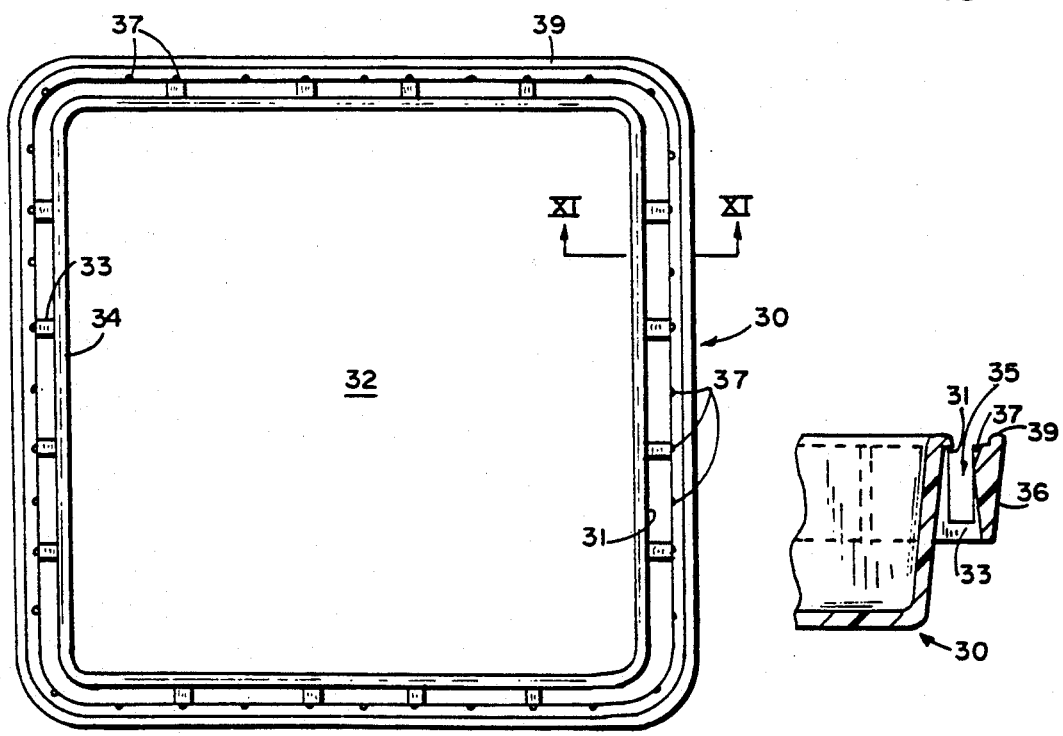
FIG. 10 is a top plan view of the substrate shown in FIG. 9.
FIG. 11 is a fragmentary cross-sectional view taken along section lines XI—XI of FIG. 10.

Member 30 is a concave member having a floor 32, four side walls 34 which include an integral outwardly projecting U-shaped peripheral channel 35 formed therein. The upper edge of wall 34 includes an outwardly projecting lip 31 which extends into the channel 35 as best seen in FIG. 11. Channel 35 is defined by a peripheral floor, in turn defined by a plurality of spaced bridging segments 33, which couple an outer generally vertically extending wall 36 to wall 34. Wall 36 has a plurality of spaced conical apertures 37 formed downwardly therein which mate with and receive a plurality of downwardly projecting conically shaped pins 57 of the trim member 50.

Figures 9, 13:
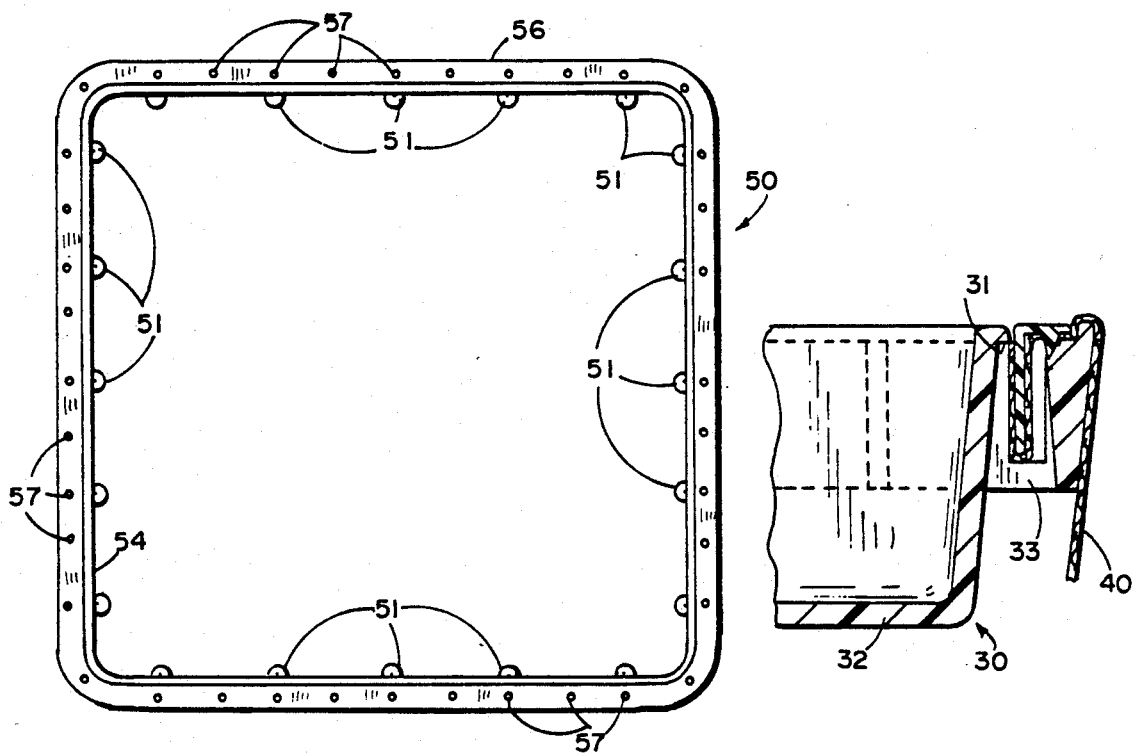
FIG. 9 is a bottom plan view of the structure shown in FIG. 7.
FIG. 13 is an enlarged fragmentary cross-sectional assembled view of a portion of the structure shown in FIG. 10-12.

Trim member 50 comprises a generally rectangular member shaped to conform to the shape of the rectangular and U-shaped channel 35 and includes a vertical wall member 54 having a plurality of inwardly projecting triangularly tapered locking members 51 formed therein as best seen in FIGS. 7 & 8. Members 51 include a top surface 53 which lockably engage the underside of lip 31 of channel 35 as seen in FIG. 13. Member 50 also includes an outwardly generally horizontally projecting peripheral lip 56 the underside of which includes the plurality of spaced downwardly projecting conical pins 57. Upholstery material 40, as best seen in FIGS. 12 and 13 is extended over the U-shaped channel 35 and trim member 50 is depressed downwardly into channel 35 such that wall 54 extends toward the floor 33 until edge 53 of members 51 fit under lip 31 and lockably engage the member with fabric 40 compressed within the channel 35. The pins 57 assist in tightly securing the fabric within the channel and stretching the fabric taunt along the upper edge 39 of wall 36 to provide a neat trim appearance to the material. The upper surface 58 of lip 56 can be textured to provide a desired ornamental appearance and the material, like the material of the first embodiment, is a suitable polymeric material which can be colored to blend with the fabric or other upholstery material being used.

It will become apparent to those skilled in the art that various modifications to the preferred embodiment of the present invention can be made without departing from the spirit or scope thereof as defined by the appended claims.

The embodiments of the invention in which an exclusive property or privilege is claimed are defined as follows.

1. A vehicle accessory comprising:
   a substrate having a generally U-shaped channel along an edge thereof and including at least one tab gripping surface along at least one side of said generally U-shaped channel;
   upholstery material overlying said substrate and having an edge extending over said channel; and
   a trim member having a first portion and a second portion joined along a common edge, a plurality of spaced locking tabs on at least one surface of said first portion, and a plurality of spaced elongated upholstery engaging pins extending from a surface of said second portion parallel to and spaced from said first portion of said trim member, said locking tabs on said first portion of said trim member lockably engage said tab engaging surface on said substrate to hold said trim member in place in said U-shaped channel and said pins on said second portion of said trim member grip said upholstery material holding it in place in said U-shaped channnel.

2. A vehicle accessory as set forth in claim 1, wherein said trim member is generally L-shaped.

3. A vehicle accessory as set forth in claim 1, wherein said substrate and said trim member are molded of a polymeric material.

4. A vehicle accessory as set forth in claim 1, wherein said trim member includes a textured outer surface.

5. A vehicle accessory as set forth in claim 4, wherein said U-shaped channel has a surface opposite said tab gripping surface, having a plurality of pin receiving apertures therein, for cooperating with said pins on said trim member in gripping said upholstery material.

* * * * *